No. 641,850. Patented Jan. 23, 1900.
P. H. FISHELL.
CARRIAGE WHEEL OILER.
(Application filed Oct. 16, 1899.)
(No Model.)

Attest.
Chas R Scott
J. F. Groat.

Inventor
Peter H. Fishell
By J. Mc St John,
Atty

THE NORRIS PETERS CO., PHOTO-LITHO., WASHINGTON, D. C.

UNITED STATES PATENT OFFICE.

PETER H. FISHELL, OF MARION, IOWA, ASSIGNOR OF ONE-HALF TO G. L. SNYDER, OF SAME PLACE.

CARRIAGE-WHEEL OILER.

SPECIFICATION forming part of Letters Patent No. 641,850, dated January 23, 1900.

Application filed October 16, 1899. Serial No. 733,846. (No model.)

*To all whom it may concern:*

Be it known that I, PETER H. FISHELL, a citizen of the United States, residing at Marion, in the county of Linn and State of Iowa, have invented certain new and useful Improvements in Carriage-Wheel Oilers; and I do hereby declare the following to be a full, clear, and exact description of the invention, such as will enable others skilled in the art to which it appertains to make and use the same.

The object of this invention is to provide simple and convenient means for oiling carriage-axles through the hubs of the wheels and without the necessity for removing the wheels.

The nature of the invention is fully disclosed in the description and claims following, reference being had to the accompanying drawings, in which—

Figure 1:
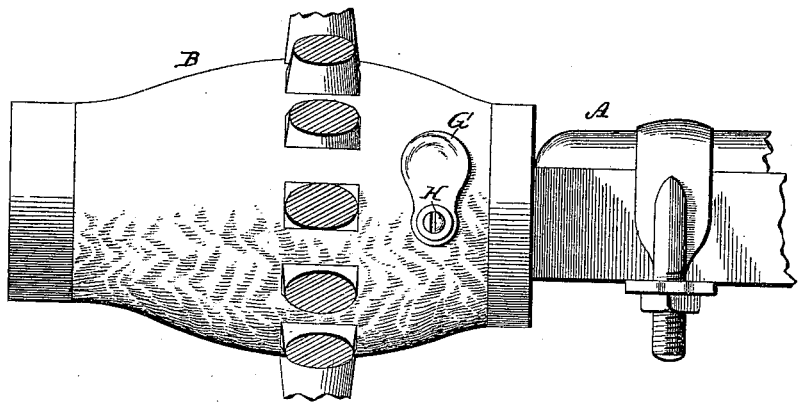
Figure 2:
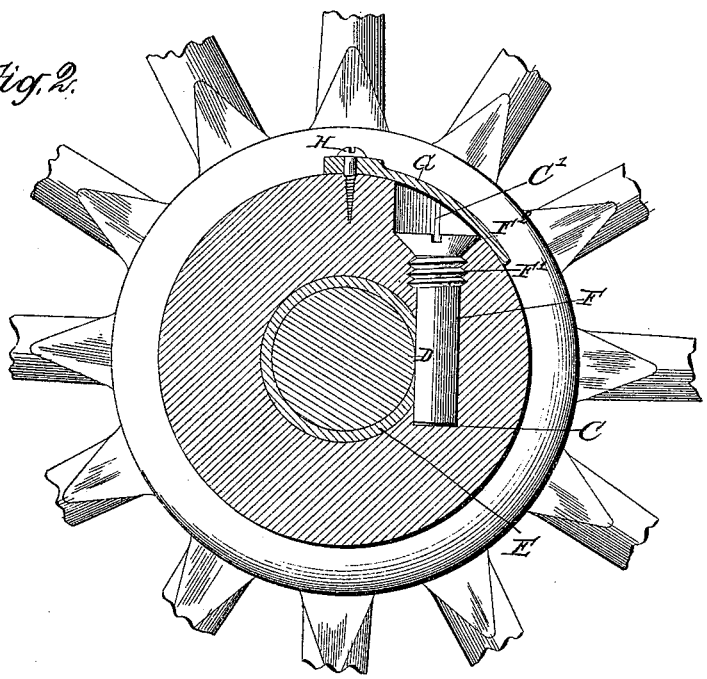

Figure 1 is a side view of a wheel-hub provided with my improved oiling device. Fig. 2 is an enlarged section of the same in the line $a\,b$ and as seen from the right.

Similar letters of reference indicate corresponding parts.

In the drawings, A designates the axle of a vehicle, and B the hub of a wheel mounted thereon. Into the hub, preferably back of the spokes, is bored a hole C, which at the point D opens through the skein E and permits oil poured into said hole to pass to and along the axle where the same is journaled to take the hub. Into this hole, which is countersunk at the upper end at C', is screwed a plug F, having a few threads F' near the head F². The body of this plug passes by the hole D, as will be seen, so that on the withdrawal of the plug the said hole is completely opened, any dirt gathering at that point being carried out by the plug.

To prevent any dirt or dust entering the hole C from the outside, the hub is provided with a cap G, pivoted, as by a screw H, so as to turn to cover or uncover the hole. This cap should be of some flexible material, such as rubber, so as to yield all that is necessary in turning it and so also as to cling closely to the hub and make a tight joint thereon.

This device enables the operator to oil his carriage-wheels without removing them and by the use of a screw-driver alone. The construction is such as to prevent the accumulation of dirt in the oil-hole, which is a common source of annoyance in the case of oil-holes generally.

It is to be understood that a fluid oil is to be used, as "axle-grease" would not be adapted to the purpose in this case.

Having thus described my invention, what I claim as new, and desire to secure by Letters Patent, is—

1. A carriage-wheel oiler, comprising a hub provided with an oil-hole tangential to and intersecting the bore thereof, and a plug fitting in said hole and extending each side of the opening into said bore, said plug being screw-threaded a short distance near the upper end, substantially as and for the purpose set forth.

2. In a carriage-wheel oiler, the combination with a hub having an oil-hole therein tangential to the axle-bore thereof and intersecting the same, of a plug fitting in said hole and screw-threaded a short distance near its upper end, and an elastic cap attached to the hub and adapted to cover the oil-hole and the head of said screw, as described.

In testimony whereof I affix my signature in presence of two witnesses.

PETER H. FISHELL.

Witnesses:
J. M. ST. JOHN,
JUDSON A. KRAMER.